United States Patent
Farmer et al.

(10) Patent No.: US 8,121,438 B2
(45) Date of Patent: Feb. 21, 2012

(54) AIRCRAFT DOORS

(75) Inventors: Michael John Charles Farmer, Crawley Down (GB); Christopher Yardley, Petersfield (GB)

(73) Assignee: Penny & Giles Aerospace Ltd, Dorset (GB)

( * ) Notice: Subject to any disclaimer, the term of this patent is extended or adjusted under 35 U.S.C. 154(b) by 907 days.

(21) Appl. No.: 10/590,890

(22) PCT Filed: Feb. 12, 2005

(86) PCT No.: PCT/GB2005/000607
§ 371 (c)(1), (2), (4) Date: Aug. 1, 2008

(87) PCT Pub. No.: WO2005/083647
PCT Pub. Date: Sep. 9, 2005

(65) Prior Publication Data
US 2008/0284619 A1    Nov. 20, 2008

(30) Foreign Application Priority Data
Feb. 27, 2004  (GB) .................................. 0404328.7

(51) Int. Cl.
G06K 7/00    (2006.01)
G08B 21/00   (2006.01)
G08B 19/02   (2006.01)

(52) U.S. Cl. ........................................ 382/312; 340/963

(58) Field of Classification Search ................. 382/312, 382/313, 317; 340/426.1, 573.1, 581, 945, 340/962, 963, 970; 342/26, 29, 33, 192, 342/455, 460; 348/744, 750, 756; 345/8; 250/222.1; 244/190, 1 R
See application file for complete search history.

(56) References Cited

U.S. PATENT DOCUMENTS

| | | | |
|---|---|---|---|
| 4,389,647 A * | 6/1983 | Fanuele et al. ................. 342/192 |
| 5,075,694 A * | 12/1991 | Donnangelo et al. ......... 342/455 |
| 5,407,149 A * | 4/1995 | Singhai .......................... 244/1 R |
| 5,448,233 A * | 9/1995 | Saban et al. ................... 340/963 |
| 5,521,584 A * | 5/1996 | Ortolano et al. .............. 340/581 |
| 5,557,278 A * | 9/1996 | Piccirillo et al. ................ 342/29 |
| 5,724,040 A * | 3/1998 | Watnick ...................... 342/26 D |
| 5,920,276 A * | 7/1999 | Frederick .................... 342/26 B |
| 6,154,151 A * | 11/2000 | McElreath et al. ........... 340/970 |
| 6,819,264 B2 * | 11/2004 | Bissett .......................... 340/945 |
| 2003/0010888 A1 | 1/2003 | Shimada et al. ........... 250/201.1 |
| 2003/0174255 A1 | 9/2003 | Lee et al. ...................... 348/744 |
| 2004/0145540 A1 | 7/2004 | Amanai ............................ 345/8 |
| 2008/0284619 A1* | 11/2008 | Farmer et al. ................. 340/963 |

FOREIGN PATENT DOCUMENTS

| | | |
|---|---|---|
| DE | 199 43 040 A1 | 3/2001 |
| GB | 2 066 536 A | 7/1981 |
| JP | 8-220455 | 8/1996 |
| JP | 10-206969 | 8/1998 |
| JP | 10-293268 | 11/1998 |
| JP | 2002-341280 | 11/2002 |
| JP | 2003-101909 | 4/2003 |
| JP | 2003-279889 | 10/2003 |

* cited by examiner

*Primary Examiner* — Amir Alavi
(74) *Attorney, Agent, or Firm* — Panitch Schwarze Belisario & Nadel LLP

(57) ABSTRACT

An alarm system for an aircraft door is disclosed. The alarm system comprises a sensor for sensing when the door operating handle is about to be gripped by an operator and an aural alarm associated with the sensor. The oral alarm sounds when the sensor detects that the handle is about to be gripped. Means are provided for arming the sensor and/or the aural alarm when the aircraft door is armed.

28 Claims, 2 Drawing Sheets

AIRCRAFT DOORS

RELATED APPLICATIONS

This application is a 35 U.S.C. 371 national stage filing of International Application No. PCT/GB2005/000607, filed 12 Feb. 2005, which claims priority to Great Britain Patent Application No. 0404328.7 filed on 27 Feb. 2004 in Great Britain. The contents of the aforementioned applications are hereby incorporated by reference.

BACKGROUND OF THE INVENTION

This invention relates to aircraft doors of the type typically used on passenger transport aircraft, in particular the invention relates to an alarm system for alerting cabin crew when a door is "armed".

Doors of passenger transport aircraft are commonly fitted with inflatable slides to assist passenger evacuation in an emergency situation. Slides are typically stored in a bustle within the aircraft door. Such slides may be detachable from the aircraft to be used as life rafts. Prior to take off of an aircraft it is usual to "arm" the doors. This means a door is configured such that if it is opened, the emergency evacuation slide is released from the bustle. On release of the slide, gravity causes discharge of an associated gas pressurised cylinder which inflates the slide.

Whilst such a feature is desirable in the event of an emergency evacuation of the aircraft, if the armed door is opened while the aircraft is stationed at an airport, inflation and deployment of the slide can cause injury to airport ground crew. Also, once a slide has been deployed, the door cannot be operable as an emergency exit until the slide has been replaced, a consequence being that the number of passengers which can be safely transported by the aircraft is reduced. It will also be appreciated that repackaging and replacement of a slide is time consuming and expensive and is desirably avoided.

In order to avoid accidents or injury at airports, aircraft doors are fitted with one or more visual indicators of the status of the door, for example a door might include a light which displays in one colour when the door is armed and a different colour when the door is unarmed. Alternatively, a door might include a slidable or rotatable handle which can be moved between a position marked "ARMED" and a position marked "DISARMED" and/or a slide placard which displays when the door is armed and is hidden when the door is not armed.

Whilst such indicators are generally effective, the inventors have recognised that in some circumstances a person might not register the indicator prior to acting to open the door. For example, the visual indicator may become obscured by another body, or a cabin crew member may be distracted when approaching the door and forget to check its status. As different aircraft have doors with different visual indicators, it is also conceivable that a cabin crew member operating on an aircraft of a type they have not previously encountered may misinterpret a visual indicator assuming a door to be disarmed when it is, in fact, armed.

An alarm system activated by a touch-sensitive door knob is disclosed in U.S. Pat. No. 3,824,576. In this patent rotation of the door knob retracts a latch bolt thus causing an electrical connection between the knob and the bolt thereby triggering an alarm. The system also provides a procedure whereby authorised personnel can enter the premises and de-activate the alarm system before the alarm is activated either through a time-delay circuit or through a separate de-activation means outside the building.

SUMMARY OF THE INVENTION

It is an aim of the present invention to provide a novel aircraft door alarm system which alerts a door operator of the armed status of a door as the operator attempts to open the door.

In accordance with a first aspect, the present invention provides an alarm system for an aircraft door comprising;
a sensor for sensing when the door operating handle is about to be gripped by an operator,
an aural alarm associated with the sensor and operable to sound when the sensor detects that the handle is about to be gripped,
means for arming the sensor and/or aural alarm when the aircraft door is armed.

The sensor may be a contactless type or alternatively may be a pressure sensor. As such, the term "about to be gripped" covers a situation where the sensor senses the hand of an operator prior to the handle being touched and a situation where the sensor senses pressure on the handle at the point where the handle is first touched.

The system may be incorporated into an operating handle for the door or may be retrofittable to an existing door handle. Most conveniently, the sensor may comprise a pressure sensor located on or in the handle which sensor responds to hand pressure of an operator gripping the handle. Alternatively a sensor could be light, heat, humidity or chemically sensitive responding to contact with a characteristic of an operators hand.

The aural alarm is desirably electrically operated. The sound made by the alarm may be one or more tones, optionally a repeating sequence of tones. Alternatively, the alarm may broadcast a pre-recorded voice message indicating that the door is armed.

The means for arming the sensor and/or aural alarm may be manual or automatic. Desirably, arming is automatically effected when the door is armed. For example, the arming means may be mechanically, electrically, optically or magnetically coupled to an existing means for arming the door or an existing visual indicator for indicating the status of the door.

In one option, the arming means may include a sensor which is activated following a change in the status of the door. For example, the sensor may be a light sensor obscurable by an operating switch or handle for arming the door when the position of the switch or handle is changed. In another example, the arming means may include a magnetically sensitive switch such as a Reed switch which is responsive to a magnetic field which changes when a door is switched between an armed and an unarmed configuration.

The alarm system may include its own power source, for example but not strictly limited to a dry cell. Alternatively, the alarm system may tap power from an existing power source used to power the door and/or aircraft.

Desirably, the alarm system includes its own indicator that it has been armed. Such an indicator may, for example, be a light emitting diode which lights or pulses when the system is armed.

The system may be completely hard wired or may use one or more wireless connections between various of its components and/or existing components of the aircraft door. For example, there may be a blue tooth link between the sensor and alarm or between the means for activating the sensor and the sensor.

In another aspect, the invention comprises a handle for an aircraft door incorporating the previously described alarm system.

In yet another aspect, the invention comprises an aircraft door equipped with an alarm system as previously described.

BRIEF DESCRIPTION OF THE DRAWINGS

For the purposes of illustration, one embodiment of the invention will now be further described with reference to the following Figures in which.

DESCRIPTION OF ILLUSTRATED EMBODIMENT

Figure 1:
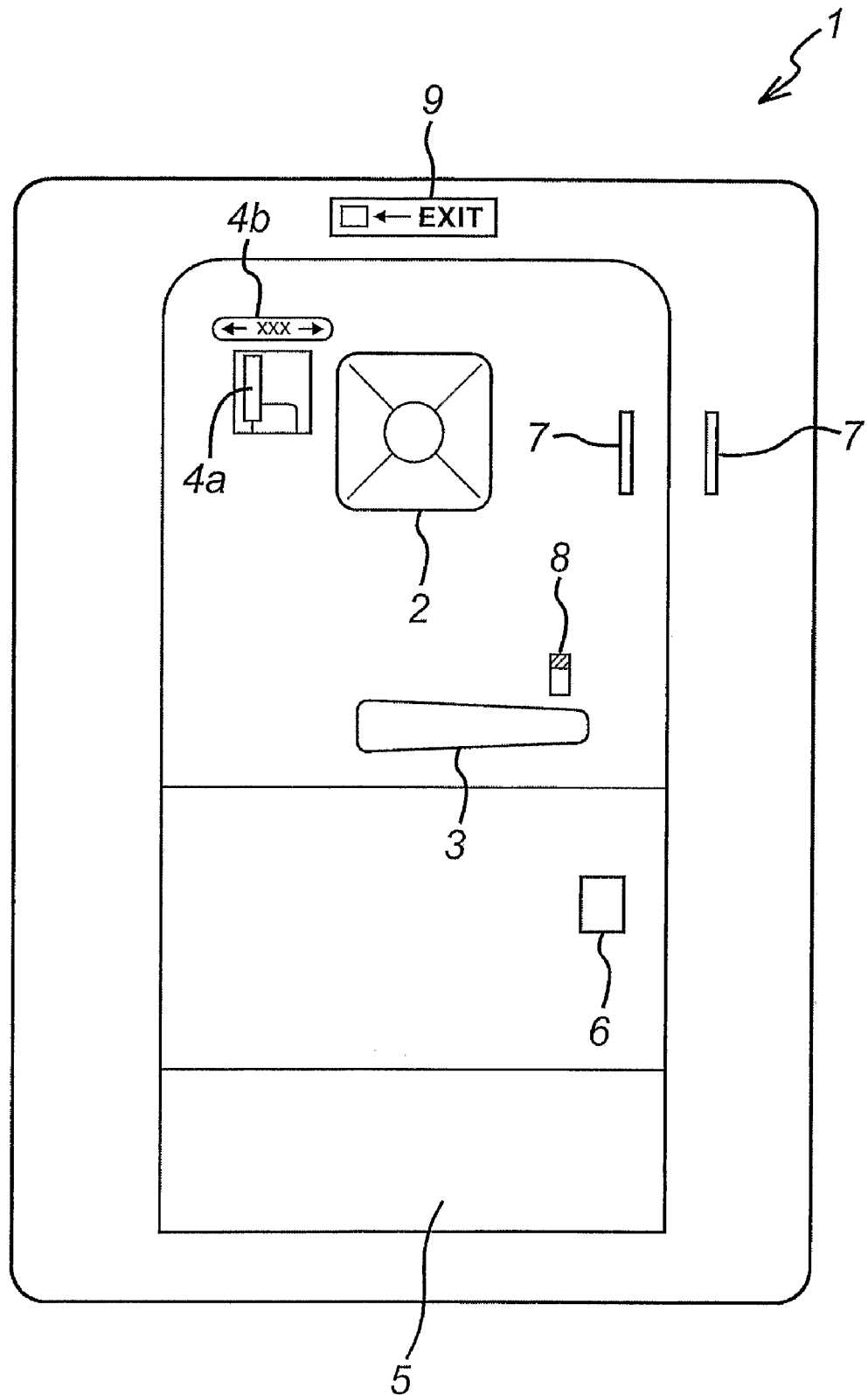
FIG. 1 illustrates the front face of an aircraft door as is known in the prior art.

As can be seen from FIG. 1 a typical aircraft door 1 (in this case a door used on a Boeing 757 aircraft) includes a viewing window 2, an operating handle 3 for opening and locking the door 1 and a door mode select panel 4a, 4b for arming and disarming the door 1. At the bottom of the door 1 is a bustle 5 in which an emergency evacuation slide (not shown) is stowed. Immediately above the bustle 5 is stowed a container of pressurised gas for inflating the slide in the event of an emergency. A pressure gauge 6 displays the pressure of the gas on the front of the door 1. A pair of handles 7 are provided towards the top and right of the door 1 which an operator can use to manoeuvre the door 1.

The door mode select panel 4a, 4b comprises an operating switch 4a and a position indicator 4b. The position indicator 4b illustrates the direction in which the switch 4a need be switched to respectively arm and disarm the door 1. Just above the operating handle 3 is a slide placard 8. When the door 1 is disarmed, the slide placard is retained in the body of the door 1, flush with the surface of the door 1. When the door 1 is armed by appropriate operation of the switch 4a, the slide placard is caused to pop out of the door and display an indicator that the door is armed. At the top of the door 1 is an LED 9 which is lit when the door 1 is armed and not lit when the door 1 is disarmed. Thus there are three visual indicators (LED 9, slide placard 8 and display panel 4a, 4b) showing status of the door 1 as armed or disarmed.

Figure 2:
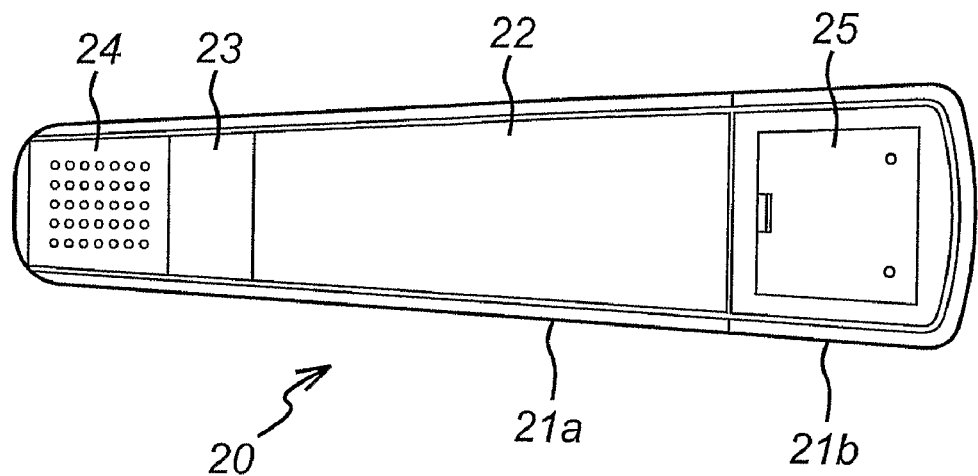
FIG. 2 illustrates a handle for an aircraft door incorporating an embodiment of the alarm system of the invention.

FIG. 2 shows the reverse side of a door operating handle 20 similar to that referenced 3 in FIG. 1. The handle has a substantially C shaped cross section made up of walls 21a, 21b and the front surface (not shown) of the handle 20. A taller walled section 21b is provided at one end of the handle to allow attachment to the front of a door whilst providing a clearance around the remainder of the handle 20 so that it may be gripped.

Enclosed within the C section is an alarm system in accordance with the invention, 22, 23, 24, 25. Extending across a central portion of the handle is a pressure sensitive pad 22 enclosing an electrical circuit supplying the alarm system. Adjacent the pressure sensitive pad is an arming device 23 which is responsive to arming of an aircraft door to which the handle 20 is attached to arm the alarm system 22, 23, 24, 25.

Adjacent the arming device 23 is a speaker 24 of an alarm sounder. The system is powered by a battery pack enclosed in a container 25.

It will be appreciated that the components of the system as described in relation to FIG. 2 could be re-ordered without affecting the mode of operation of the invention.

Figure 3:
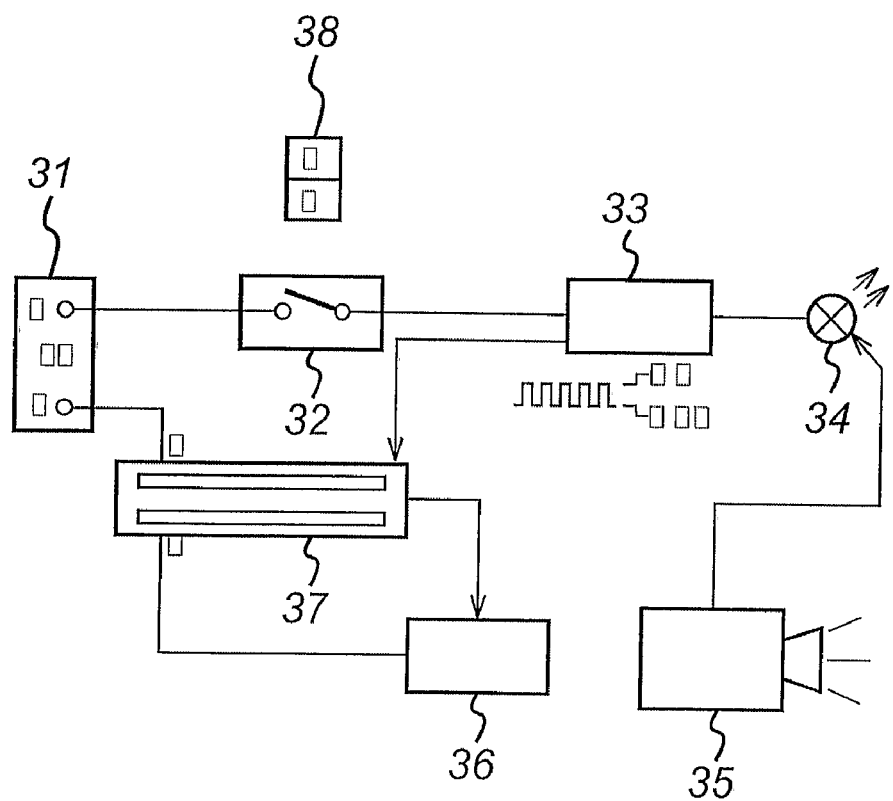
FIG. 3 illustrates a circuit diagram for an embodiment of an alarm system in accordance with the invention.

FIG. 3 shows a circuit diagram for an alarm system substantially similar to the embodiment illustrated in FIG. 2. The circuit comprises a 9 v dry power cell 31 which powers pressure sensor 37.

The system is armed through arming device 32, 38 which comprises a Reed switch 32 and ceramic magnet 38. The ceramic magnet 38 is associated with a slide placard of an aircraft door, the Reed switch being positioned, in use, in close proximity to the placard and magnet 38. When a door to which the system is mounted is armed, the slide placard pops out and the magnetic field near the magnetically sensitive Reed switch 32 is magnified. The change in the field is such as to cause the switch 32 to close. The alarm system circuit is now armed. Once the system is armed but not activated (i.e. there is no detection of pressure by sensor 37) a battery saver circuit 33 pulses a low current supply to LED 34 which emits an intermittent light, this provides a visual indicator that the system is armed and in a "stand by" mode.

When the pressure sensor 37 is subjected to pressure, for example when the door handle is gripped, a sub circuit including the pressure sensor 37 and LED 34 is closed and the LED becomes permanently lit, taking current directly from the dry cell 31 indicating the alarm has been activated.

Simultaneously, a latch circuit 36 is closed and the latch circuit 36 grabs power from the cell 31. The active latch circuit 36 triggers the broadcast of a timed, audible alarm, for example a pre-recorded voice message, through speaker/amplifier circuit 35.

Once the pressure sensor 37 is relieved of pressure, the supply conduits between the sensor 31 and each of the latch circuit 36 and LED 34 are closed, the alarm stops sounding and the LED reverts to blinking. Once the door is disarmed, the slide placard reverts to the "disarmed" position withdrawing the magnet 38 from the Reed switch 32 causing the switch 32 to open. The alarm system is then disarmed and the door can be operated without setting off the aural alarm.

In an alternative embodiment (not shown) only the sensor is incorporated into an operating handle for the door. The electronic circuitry providing communication between the sensor and the arming means and aural alarm are located or are incorporated into the door structure.

In a further alternative embodiment (also not shown) the sensor is incorporated into, or located on, the door structure preferably just behind the handle. The sensor is close enough to the handle to sense when the handle is, or is about to be, touched by an operator.

It is to be understood that the forgoing is merely representative of one embodiment which the alarm system of the invention may take, other embodiments will no doubt occur to the skilled addressee without the need for inventive thought and without departing from the scope of the invention as claimed in the appended claims.

The invention claimed is:
1. An alarm system for an aircraft door comprising;
   a sensor for sensing when a door operating handle is about to be gripped by an operator,
   an aural alarm associated with the sensor and operable to sound when the sensor detects that the handle is about to be gripped, and means for automatically arming at least the sensor or the aural alarm when an emergency evacuation slide of the aircraft door is armed so as to be released if the air craft door is opened.

2. An alarm system as claimed in claim 1, wherein the aural alarm and the means for arming the sensor and/or activating the aural alarm are embodied in the aircraft door.

3. An alarm system as claimed in claim 1 wherein the sensor is incorporated in, or located on, the door operating handle.

4. An alarm system as claimed in claim 1, wherein the sensor is incorporated into, or otherwise located on, the aircraft door within the vicinity of the door operating handle.

5. An alarm system as claimed in claim 1 which is embodied in a door operating handle for an aircraft door.

6. An alarm system as claimed in any one of the claim 1 wherein the sensor comprises a pressure sensor.

7. An alarm system as claimed in claim 1 wherein the sensor is a light sensor.

8. An alarm system as claimed in claim 1 wherein the aural alarm is electrically operated.

9. An alarm system as claimed in claim 8 wherein the aural alarm sounds one or more tones.

10. An alarms system as claimed in claim 9 wherein the aural alarm sounds a repeating sequence of tones.

11. An alarm system as claimed in claim 8 wherein the alarm sounds a pre-recorded voice message in one or more languages.

12. An alarm system as claimed in claim 1 wherein the arming means is mechanically, electrically, optically or magnetically couplable to an existing means for arming an aircraft door or an existing visual indicator for indicating the status of the aircraft door.

13. An alarm system as claimed in claim 12 wherein the arming means includes a sensor which is activated following a change in the status of the door.

14. An alarm system as claimed in claim 13 wherein the arming means sensor is a light sensor obscurable for an operating switch or handle for arming the door when the position of the switch or handle is changed.

15. An alarm system as claimed in claim 13 wherein the arming means includes a magnetically sensitive switch which is responsive to a magnetic field which changes when an aircraft door to which it is attachable is switched between an armed and an unarmed configuration.

16. An alarm system as claimed in claim 15 wherein the changing magnetic field is associated with a slide placard of an aircraft door to which the alarm system is attachable.

17. An alarm system as claimed in claim 1 further comprising a power source.

18. An alarm system as claimed in claim 17 wherein the power source is a dry cell.

19. An alarm system as claimed in claim 1 wherein the alarm system is configured to tap power from an existing power supply of an aircraft door or aircraft to which it is attachable.

20. An alarm system as claimed in claim 1 wherein the alarm system comprises an indicator that the system has been armed.

21. An alarm system as claimed in claim 20 wherein the arming system indicator is a light emitting diode which lights or pulses when the system is armed and ceases when the system is not armed.

22. An alarm system as claimed in claim 1 wherein the system is hard wired.

23. An alarm system as claimed in claim 1 further comprising one or more wireless connections between various system components and/or existing components of an aircraft door to which it maybe attached.

24. An alarm system as claimed in claim 23 wherein a blue tooth link is provided between the sensor and alarm or between the means for arming the sensor and the sensor.

25. An operating handle for an aircraft door incorporating the alarm system of claim 1.

26. An operating handle as claimed in claim 25 wherein the handle is substantially C shaped in cross section and one or more of the components of the alarm system are mounted within the C shaped cross section.

27. An aircraft door incorporating an operating handle as claimed in claim 26.

28. An aircraft door incorporating an operating handle as claimed in claim 25.

* * * * *